United States Patent
Jung

(10) Patent No.: US 7,469,567 B2
(45) Date of Patent: Dec. 30, 2008

(54) DEVICE FOR MACHINING PROTRUSIONS, TEETH, BURRS, CRIMPS AND THE LIKE IN A BRAKE LINING CARRIER PLATE

(75) Inventor: Friedrich Jung, Waldbrunn-Ellar (DE)

(73) Assignee: METEK Metallverarbeitungs Gesellschaft GmbH, Meckenheim (DE)

( * ) Notice: Subject to any disclaimer, the term of this patent is extended or adjusted under 35 U.S.C. 154(b) by 551 days.

(21) Appl. No.: 11/161,235

(22) Filed: Jul. 27, 2005

(65) Prior Publication Data
US 2006/0228184 A1  Oct. 12, 2006

(30) Foreign Application Priority Data
Apr. 11, 2005 (DE) .................... 10 2005 016 466

(51) Int. Cl.
*B21D 31/02* (2006.01)
(52) U.S. Cl. ........................ 72/325; 72/452.9
(58) Field of Classification Search ........... 72/324, 72/325, 459.9; 76/14, 19, 21, 13, 24.5; 188/250 G
See application file for complete search history.

(56) References Cited

U.S. PATENT DOCUMENTS

| | | | |
|---|---|---|---|
| 649,762 A | 5/1900 | Saltzkorn et al. | |
| 1,044,283 A | 11/1912 | Stanger | |
| 2,255,268 A * | 9/1941 | Perrine ......................... | 76/14 |
| 3,557,407 A | 1/1971 | Lemelson | |
| 4,005,991 A | 2/1977 | Uebayaski et al. | |
| 4,569,424 A | 2/1986 | Taylor, Jr. | |
| 4,799,579 A | 1/1989 | Myers et al. | |
| 5,376,410 A | 12/1994 | Mackelvie | |
| 6,431,331 B1 | 8/2002 | Arbesman | |
| 6,464,047 B1 | 10/2002 | Arbesman | |
| 6,843,095 B2 | 1/2005 | Arbesman | |
| 6,910,255 B2 | 6/2005 | Arbesman | |

FOREIGN PATENT DOCUMENTS

| | | |
|---|---|---|
| CA | 263871 | 8/1926 |
| CA | 311275 | 5/1931 |
| CA | 1330521 | 7/1994 |
| CA | 1337622 | 11/1995 |
| DE | 103 26 962 B3 | 11/2004 |
| DE | 103 47 409 A1 | 5/2005 |
| EP | 1 484 524 A1 | 12/2004 |
| GB | 2 245 667 A | 8/1992 |
| WO | WO-00/49308 | 8/2000 |
| WO | WO-03/081075 A1 | 10/2003 |

* cited by examiner

*Primary Examiner*—Derris H Banks
*Assistant Examiner*—Debra M Wolfe
(74) *Attorney, Agent, or Firm*—Connolly Bove Lodge & Hutz LLP

(57) ABSTRACT

A device for machining protrusions, teeth, burrs, crimps and the like in a brake lining carrier plate has a tool unit (51; 61, 61') with several tool elements (53; 62, 62') with cutting teeth. During the crimping procedure, the unit is moved towards a first axis (54) and towards a second axis (55) running perpendicular thereto, whereby the first axis (54) coincides essentially with the surface normal of the brake lining carrier plate. Forced-control means arranged between the compressing part (52) and the tool unit (51; 61, 61') move the tool unit (51; 61, 61') towards the first axis (54). Forced-guidance means move the tool unit (51; 61, 61') towards the second axis (55). The tool elements (53; 62, 62') of the at least one tool unit (51; 61, 61') are arranged in a fixed position relative to each other.

37 Claims, 9 Drawing Sheets

DEVICE FOR MACHINING PROTRUSIONS, TEETH, BURRS, CRIMPS AND THE LIKE IN A BRAKE LINING CARRIER PLATE

The invention relates to a device for machining protrusions, teeth, burrs, crimps and the like in a brake lining carrier plate, having a tool unit which is driven into the brake lining carrier plate by means of a compressing part and subsequently moved away from it again, whereby the tool unit consists of several tool elements with cutting teeth. During the crimping procedure, the unit is moved towards a first axis that coincides essentially with the surface normal of the brake lining carrier plate and towards a second axis running perpendicular thereto. The apparatus has forced-control means arranged between the compressing part and the tool unit for moving the tool unit towards the first axis, as well as forced-guidance means for moving the tool unit towards the second axis.

TECHNICAL BACKGROUND

Devices for machining protrusions, teeth, burrs and crimps and the like are already known from WO 00/49308 A1 and from DE 103 26 962 A1. In these publications, the tool unit used for machining protrusions, teeth, burrs, crimps and the like in a brake lining carrier plate consists of several tool elements that can be adjusted with respect to each other in opposite directions. As a result, protrusions are machined in rows in the brake lining carrier plate while depressions are formed in such a way that the position of the protrusion and depression alternates between adjacent rows. In other words, the protrusions and the corresponding depressions in adjacent rows created during the crimping procedure run in opposite directions.

Therefore, the brake lining carrier plates machined by means of prior art devices exhibit rows of protrusions and corresponding depressions that end with a depression on one side. These depressions normally lying in the edge area of the friction lining that is fitted onto the brake lining carrier plate encourage accumulation of moisture in the depressions. Such moisture leads to detachment of the friction lining from the brake lining carrier plate in this area (edge lifting). Moreover, due to the fact that the tool elements can be adjusted with respect to each other in opposite directions, the prior art devices exhibit a complex design, particularly in the area of the tool element holding fixture.

A device with a simple design that avoids the risk of detachment of the friction lining from the brake lining carrier plate, particularly in the edge area of the friction lining, would be an improvement over these prior devices.

SUMMARY OF THE INVENTION

In one aspect of the invention, a device for machining a brake lining carrier plate has tool elements that are arranged in a fixed position relative to each other. By means of this measure, when the tool unit is moved towards the second axis, the tool elements move in the same direction. In this manner, rows of protrusions and corresponding depressions are produced in the brake lining carrier plate, all of which end with a protrusion on one side of the brake lining carrier plate and which have a depression on the opposite end. In a subsequent work step, the rows can then be lengthened, for example, by rotating the brake lining carrier plate on the work bench of the device by 180°, in such a way that the rows also have a protrusion at the other end. The arrangement of protrusions that can be thus created by means of the device according to the invention counteracts the detachment of the edges of the friction lining from the brake lining carrier plate since the protrusions present at the beginning and at the end of the rows prevent penetration of moisture into the edge areas of the friction lining. Moreover, the fixed positioning of the tool elements with respect to each other allows for a simple design of the tool unit.

According to a first embodiment of the invention, the tool elements are arranged in a fan formation in their lengthwise extension. As a result of the alignment of the protrusions thus created on the brake lining carrier plate, the outer contour of the friction lining is taken into account, especially in conventional disk brakes, thus additionally counteracting the penetration of moisture into the edge area between the friction lining and the brake lining carrier plate.

According to another embodiment of the invention, the tool elements are secured in a tool holding fixture and at least one spacer is positioned between adjacent tool elements in order to achieve a fan formation. In this manner, the tool elements can be easily aligned so as to be aligned in a fan formation at a defined distance from each other. The resultant fan formation of the protrusions on the brake lining carrier plate has the advantage that the surface structure can be adapted to the contour of the friction lining of the brake lining carrier plate.

Here, it is advantageous for the spacer to be secured positively and/or non-positively in order to prevent it from falling out of the tool holding fixture, for instance, when the tool elements are raised after the machining procedure. The spacer can be affixed particularly easily if it is welded onto one of the two adjacent tool elements.

It is advantageous if the tool elements can be clamped between contact elements of the tool holding fixture. In this manner, the tool elements can be positioned precisely in the tool holding fixture.

It is likewise advantageous if one of the contact elements of the tool holding fixture can secure the tool elements against moving towards the first (vertical) axis. This can prevent the tool elements from falling out of the tool holding fixture, for instance, when the tool holding fixture is raised after the machining procedure.

According to yet another embodiment of the invention, the teeth of the tool elements are distributed in circular arcs or on elliptical orbits. As a result, an arrangement of protrusions can be produced on the brake lining carrier plate that is adapted to the contour of conventional friction linings for the brake lining carrier plate, so that edge lifting is counteracted in a particularly effective manner. Such an arrangement of the teeth can be realized particularly easily if the tool elements are configured identically. In this case, it is advantageous for the distribution of the teeth to be formed by a circularly or elliptically shaped contact edge of one of the contact elements. In this manner, the distribution of the teeth in circular arcs or on elliptical orbits is attained simply by placing the ends of the tool elements onto the contact edge.

Finally, it is advantageous for the tooth tips to face the direction of movement. As a result, a good cutting effect and thus precise machining of the protrusions in the brake lining carrier plate can be ensured during the machining procedure.

According to still another embodiment of the invention, the forced-guidance means has at least one sliding element. The sliding element can be actuated by a preferably hydraulic or pneumatic adjusting device and moves the tool unit towards the second axis during or after the lowering of the compressing part. By means of the adjusting device, the sliding element can be moved independently of the movement of the tool unit.

According to an alternative embodiment, it is also possible for the forced-guidance means to have at least one sliding element and at least one actuating rod arranged on the compressing part in the direction of the first axis, both of which have slanted surfaces that glide along each other in order to move the sliding element towards the second axis when the compressing part is lowered. In this manner, the movements towards the first axis and towards the second axis are coupled, so that the lifting force acting upon the compressing part lowers the tool unit onto the brake lining carrier plate and, superimposed onto this movement, also moves the tool unit towards the second axis.

In still yet another embodiment of the invention, the sliding element is configured either as a push slide having a slanted surface facing away from the tool unit or else as a pull slide having a slanted surface facing the tool unit. In this manner, depending on the requirement or application in question as well as on the available space, the sliding direction easily can be changed, namely, by means of the alignment of the slanted surface, without the need to relinquish the principle of the sliding element and the actuating rod.

According to a further embodiment of the invention, the tool unit can be moved against a return force, especially the force of at least one return spring that rests against a part affixed to the housing. As a result, the adjusting device can have a simple construction since it merely moves the tool during the crimping procedure. The tool unit is returned to its starting position by means of the inexpensive return spring, and this takes place automatically when the tool unit is raised.

According to an advantageous embodiment of the invention, with a sliding element configured as a pull slide, the return force acts on the side of the tool unit that faces the sliding element. In this manner, the force used for the forward movement of the tool unit during the crimping procedure and the force used for the return movement can act on the same side of the tool unit. Consequently, the actuating system can have a particularly compact design since the return spring and the sliding element can be arranged on the same side of the tool unit.

In the case of sliding element configured as a push slide, it is practical for the return force to act on the opposite side of the tool unit that faces away from the sliding element. This allows for a simple and inexpensive design for moving the tool unit back and forth towards the second axis.

The movement path generated for the tool towards the second axis may be about 3 mm to 7 mm, preferably about 5 mm. This ensures a sufficiently long movement path or infeed in order to create the desired protrusions, teeth, burrs, crimps and the like in the brake lining carrier plate.

According to a preferred embodiment of the invention, two tool units having tool elements are available to simultaneously machine one or two brake lining carrier plates, which, for purposes of producing the protrusions, teeth, burrs, crimps and the like, can be moved in opposite directions by means of the sliding element associated with each tool unit. In this manner, when a brake lining carrier plate is being machined, one work cycle suffices to machine two sections with protrusions while creating the corresponding depressions in the brake lining carrier plates in such a way that the protrusions and depressions of the two sections are arranged in opposite directions from each other. In particular, the machined brake lining carrier plates can have rows of protrusions and corresponding depressions, the ends of both rows being provided with a protrusion. Moreover, this allows machining in a manner that is particularly gentle on the component, since the forces that act in the direction of the second axis in the component or in the brake lining carrier plate cancel each other out.

Here, time-consuming retrofitting of the tool or reclamping of the brake lining carrier plate is not necessary. Not least for this reason, such a device is particularly suited for large surfaces that are to be provided with protrusions, such as, for example, brake lining carrier plates for trucks, or else a surface that is to be machined in the direction of the longitudinal axis of the brake lining carrier plate. Finally, this also makes it possible to machine two brake lining carrier plates in one work cycle, so that this measure can double the number of brake lining carrier plates that can be machined with one device.

It is advantageous for the tool units to be positioned between the two sliding elements. A simpler construction is attained with such a symmetrical configuration.

Depending on the desired arrangement of the protrusions on the brake lining carrier plate, it can be provided that, with a fan formation, the tool elements of the two tool units diverge in opposite directions or in the same direction. Here, it is advantageous that, with the arrangement diverging in the same direction, the tool elements of the two tool units have essentially the same center of convergence. The arrangement of protrusions thus created in the brake lining carrier plate matches the contour of conventional friction linings for a brake lining carrier plate in a special way, so that possible edge lifting of the friction lining off the brake lining carrier plate is countered in a particularly effective manner.

As an alternative, it is also possible for the tool elements of the two tool units to run towards each other in a fan formation. In this context, another preferred embodiment of the invention has the tool units overlap in the starting position, whereby the ends of adjacent tool elements of one tool unit come to lie between the ends of adjacent tool elements of the other tool unit. As a result, an overlapping area is created in which numerous protrusions are machined in a certain area of the brake lining carrier plate, and a particularly good holding effect of the friction lining is achieved there.

According to another embodiment of the invention, the forced-control means comprise a wedge slide and a guiding slide having corresponding slanted surfaces. In this manner, on the one hand, precisely defined crimping of the brake lining carrier plate is possible and, on the other hand, it is likewise possible to precisely move the at least one tool unit away from the brake lining carrier plate without the risk of the protrusions, teeth, burrs and the like breaking off.

It is advantageous to provide a spacer between the compressing part and the wedge slide having at least one pressure spring that rests on the compressing part. In this context, this at least one pressure spring functions as a shock absorber so to speak, especially for the forces that occur during the machining procedure.

It is advantageous for the guiding slide to extend into a pressure part and to be guided in it. Consequently, this ensures a largely play-free and thus exact movement of the guiding slide towards the first axis.

It is likewise practical for the wedge slide to rest on the pressure part via a wedge piece, whereby the wedge bevels of the wedge slide and of the wedge piece match each other. This makes it easier for the wedge slide to glide along the slanted guide of the guiding slide when the compressing part is lowered.

In another advantageous embodiment, the wedge slide is pre-tensioned by means of a pressure spring that rests on another guiding slide. In this manner, the wedge slide is pushed back to its starting position by the pressure spring when the compressing part is raised.

It is likewise advantageous for the wedge piece to have a receptacle for the tool holding fixture on a section that passes through the pressure part. As a result, it can be ensured that the tool holding fixture with the tool unit is raised precisely from the brake lining carrier plate when the compressing part is raised.

According to another idea of the invention, guiding elements that guide the at least one actuating rod and the guiding slide are arranged on the pressure part. This accounts for a practically play-free lowering of the at least one tool unit onto the brake lining carrier plate, so that the arrangements of protrusions produced in the brake lining carrier plate during the machining are more uniform (i.e., virtually do not differ). The same approach is taken with the measure that, while the compressing part is being lowered or raised, it is guided preferably by means of at least one column element arranged on the compressing part in the direction of the first axis, said column element being positioned in a bore that is present in the pressure part.

Additional objectives, advantages, features and application possibilities of the present invention can be gleaned from the description below of several embodiments, making reference to the drawings. Here, all of the described and/or depicted features constitute the subject matter of the present invention either on their own or in any appropriate combination, also irrespective of their compilation in the claims or the way in which they refer back to the main claim.

DESCRIPTION OF THE DRAWINGS

FIG. 1 is a side view of a sectional representation of a possible embodiment of a device according to the invention for machining protrusions, teeth, burrs, crimps and the like;

DETAILED DESCRIPTION

Figure 1:
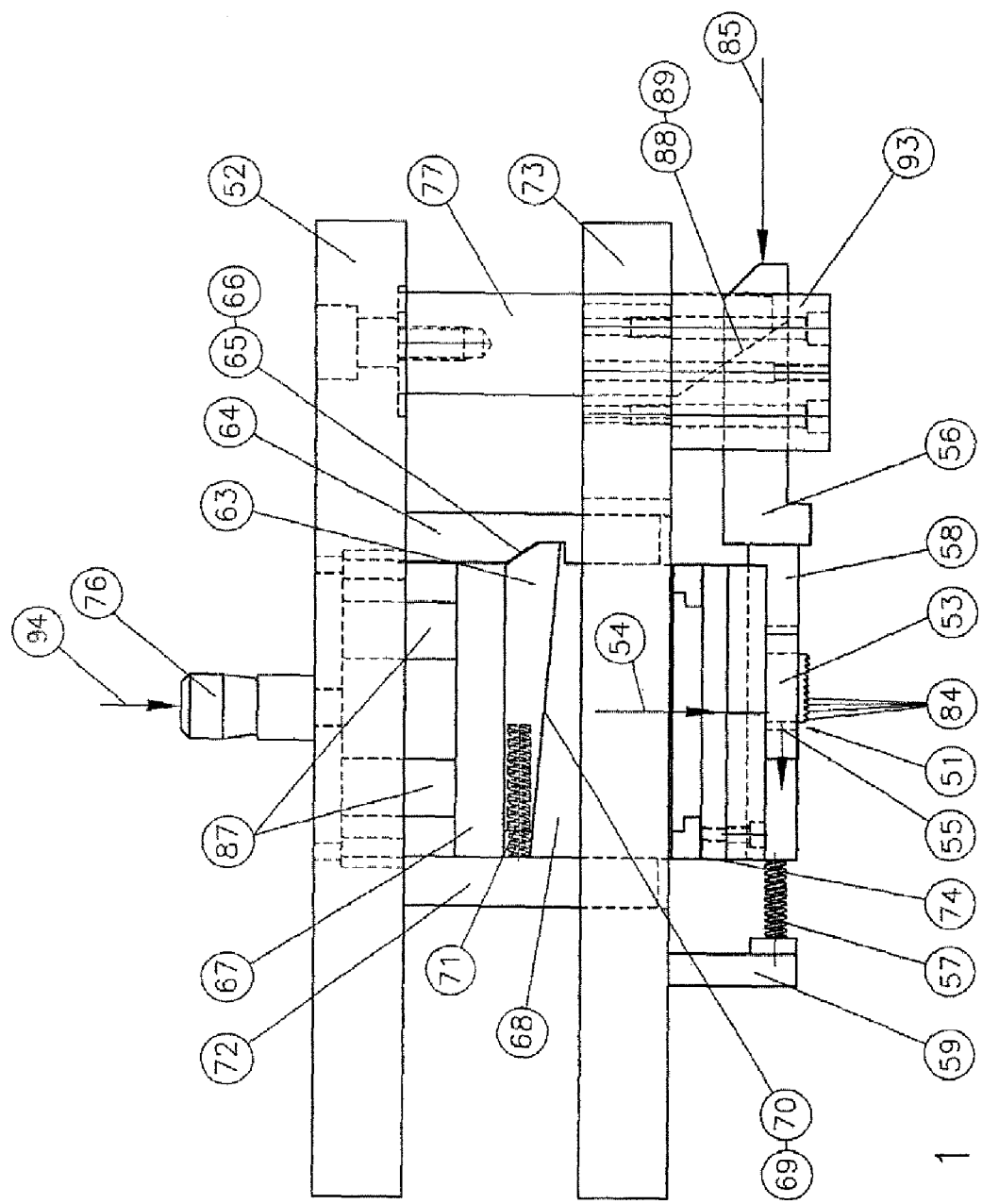
Figure 2:
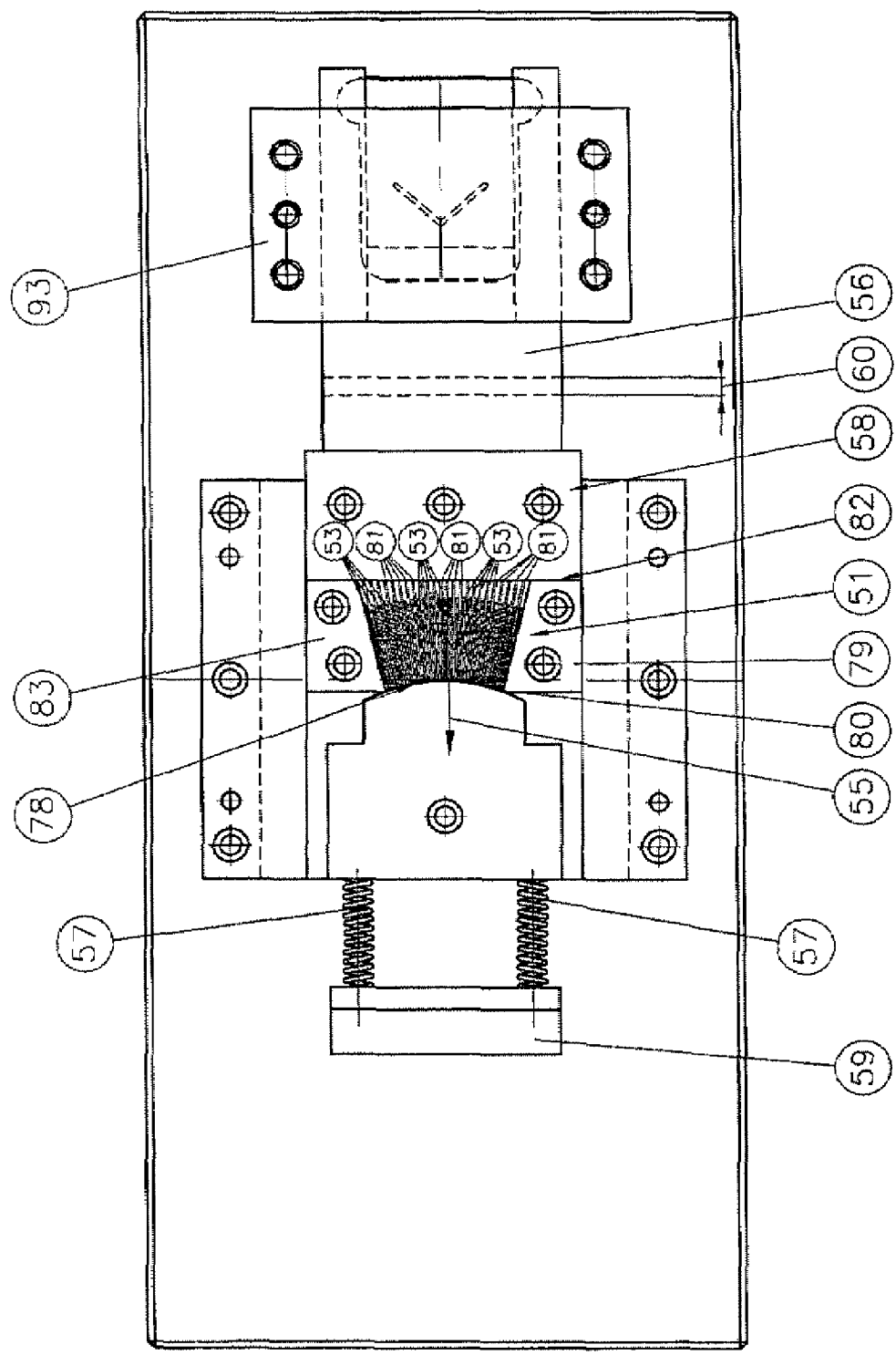
FIG. 2 is a bottom plan view of the device according to FIG. 1.

FIGS. 1 and 2 show in schematic form an embodiment of a device for machining protrusions, teeth, burrs, crimps and the like in a brake lining carrier plate. The device has a tool unit 51 which is driven into the brake lining carrier plate (not shown) by means of a compressing part 52, preferably configured as a plate or beam. Subsequently after compression, the compressing part 52 is moved away from the brake lining carrier plate again.

During the crimping procedure, the tool unit 51 is moved towards a first axis 54 and towards a second axis 55 perpendicular thereto, where the first axis 54 coincides essentially with the surface normal of the brake lining carrier plate.

The tool unit 51 consists of several tool elements 53 with cutting teeth 84. The tool elements 53 are arranged in a fixed position relative to each other. As a result, protrusions can be machined in rows in the brake lining carrier plate while depressions are formed in such a way that the rows face the same direction in terms of the arrangement of the depressions and each corresponding protrusion, so that, for instance, the rows on one side of the brake lining carrier plate all end with a protrusion.

Figure 3:
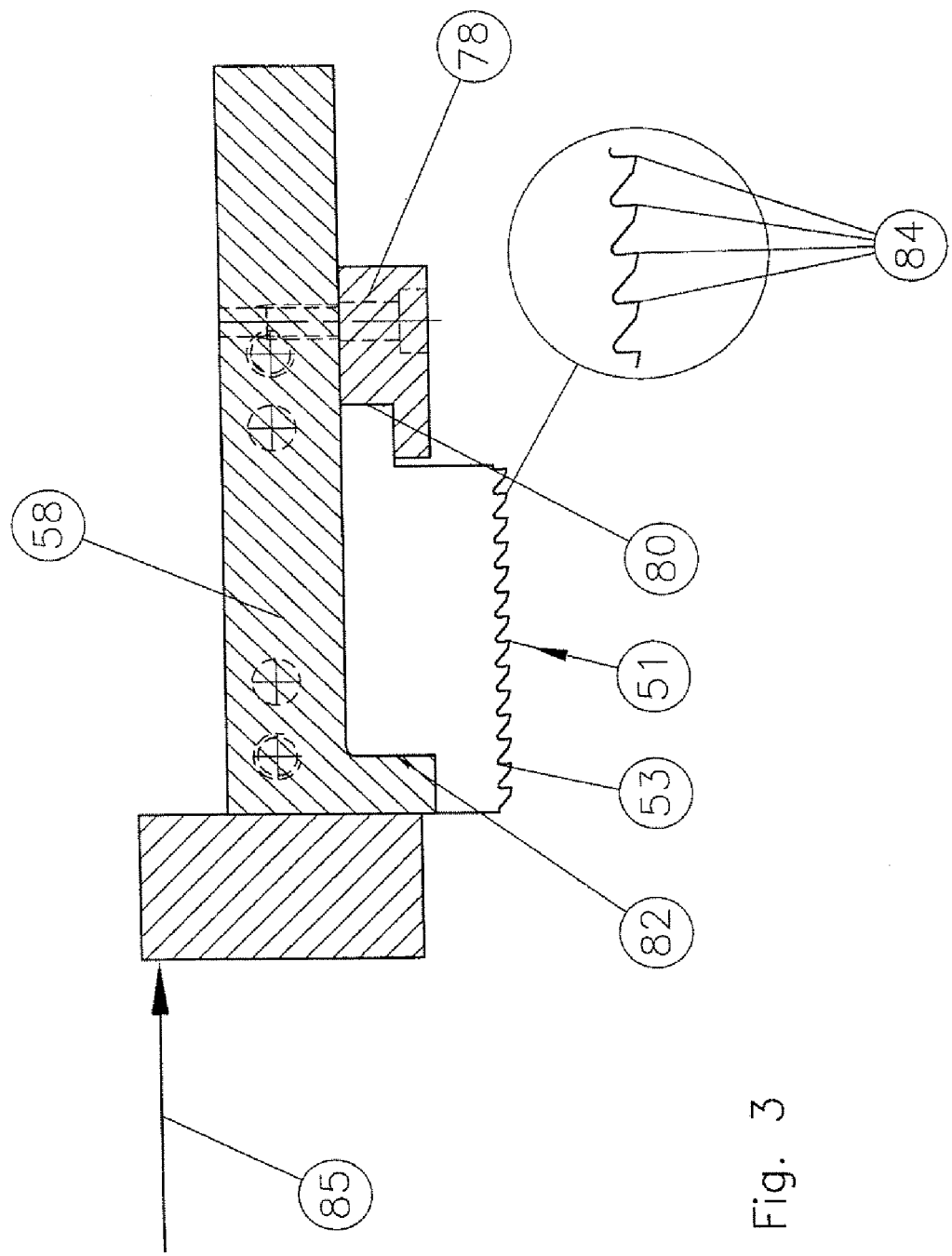
FIG. 3 is a partial cross-sectional view of a tool holding fixture of the device according to FIG. 1 with tool elements secured therein.

As is evident particularly in FIGS. 2 and 3, the tool elements 53 are secured in a tool holding fixture 58 and aligned in a fan formation in their lengthwise extension in the direction of the second axis 55. By "fan formation" is meant that the tool elements 53 are splayed radially outwardly, such that the rows of tool elements are not parallel to one another. Preferably, the tool elements 53 are straight along their length such that straight rows are formed, albeit not parallel, but splayed radially in such fan formation. In the embodiment shown in FIGS. 1 to 3, the tool elements 53 are splayed radially outwardly to form about a 40 degree arc, that is, an arc that spans about 20 degrees to one side of the axis 55 and about 20 degrees to the other side of the axis 55 (see FIG. 2).

To form the fan formation, there is at least one spacer 81 positioned between adjacent tool elements 53. In order to prevent the spacer 81 from falling out of the tool holding fixture 58, it is secured positively and/or non-positively. Preferably, it is welded onto one of the two adjacent tool elements 53.

The tool elements 53 can be clamped between contact elements 78, 79, 82, 83 of the tool holding fixture 58 (FIG. 2). Moreover, the tool elements 53 can be secured by means of a contact element 82 of the tool holding fixture 58 against moving towards the first (vertical) axis 54 (FIG. 1).

The tool elements 53 are all configured identically and their teeth are distributed along circular arcs in the tool unit 51. Of course, the teeth 84 can also be distributed along elliptical orbits. The teeth 84 are preferably distributed along a circular contact edge 80 of one of the contact elements 78, 82 (FIG. 3). As is evident particularly in the exploded view shown in FIG. 3, the tips of the teeth 84 face the direction of movement 85 of the tool unit 51.

In order to move the tool unit 51 towards the second axis 55, the device has forced-guidance means. The latter can be formed, for example, by at least one sliding element which can be actuated by a preferably hydraulic or pneumatic adjusting device, whereby said sliding element moves the tool unit 51 towards the second axis 55 during or after the lowering of the compressing part 52.

As is shown especially in FIG. 1, the forced-guidance means can also be formed by at least one sliding element 56 and at least one actuating rod 77 arranged on the compressing part 52 in the direction of the first axis 54, both of which have slanted surfaces 88, 89 that glide along each other in order to move the sliding element 56 towards the second axis 55 when the compressing part 52 is lowered. In this case, when the tool unit 51 is moved towards the first axis 54, the slanted surfaces 88, 89 also always cause a movement towards the second axis 55.

In the embodiment according to FIGS. 1 to 3, the sliding element is configured as a push slide 56 having its slanted surface 88 facing away from the tool unit 51. The tool unit 51 also can slide against a return force, especially the force of at least one return spring 57 that rests against a part 59 affixed to the housing. In the case of the sliding element 56 configured as push slide, the part 59 affixed to the housing is arranged relative to the tool unit 51 in such a way that the return force acts on the side of the tool unit 51 that faces away from the sliding element 56.

The movement path 60 traveled by the tool unit 51 towards the second axis 55 is about 3 mm to 7 mm, preferably about 5 mm. Naturally, a longer or shorter movement path is likewise possible.

Referring again to FIG. 1, in order to move the tool unit 51 towards the first axis 54, the device has forced-control means arranged between the compressing part 52 and the tool unit 51. The forced-control means comprise a wedge slide 63 and a guiding slide 64 having corresponding slanted surfaces 65, 66'. Moreover, a spacer 67 having at least one pressure spring 87 that rests on the compressing part 52 is provided between said compressing part 52 and the wedge slide 63.

The guiding slide 64 extends into a pressure part 73 and is guided in it. The pressure part 73 can be configured, for example, in the form of a plate or beam.

The wedge slide 63 rests on the pressure part 73 via a wedge piece 68, whereby the wedge bevels 69, 70 of the wedge slide 63 and of the wedge piece 68 match each other. Furthermore, the wedge slide 63 is pre-tensioned by means of a pressure spring 71 that rests on another guiding slide 72. The wedge piece 68 has a receptacle 74 for the tool holding fixture 58 arranged in a section that runs through the pressure part 73.

The mode of operation of the device will be described below with reference to FIGS. 1-3. Starting from an initial position of the compressing part 52, the tool holding fixture 58 with the tool unit 51 is in a raised position above the brake lining carrier plate (not shown) to be machined. Once pressure as shown by arrow 94 (FIG. 1) is exerted via an actuation element 76 onto the compressing part 52, the latter is moved together with the pressure part 73 on at least one actuating rod 77 downwards towards the workpiece to be machined.

Further lowering the compressing part 52 now causes the wedge slide 63 to slide with its front shaped bevel 65 along the slanted guide 66 of the guiding slide 72. As a result, the tool holding fixture 58 with the tool unit 51 is lowered towards the workpiece to be machined, and teeth 84 dig into the brake lining carrier plate (not shown). The sliding element 56 causes the tool holding fixture 58 with the tool unit 51 to be pushed towards the second axis 55, as a result of which the teeth dig into the brake lining carrier plate, each forming a depression through the displacement of material in the surface of the brake lining carrier plate, thereby creating a protrusion, tooth, burr, crimp and the like. These two movements, that is to say, the lowering movement of the tool unit 51 by means of the pressure force exerted downwards by the wedge slide 63 and the horizontal movement of the tool unit 51, are superimposed over each other, thus causing the crimping of the workpiece. It is also possible for these two movements to be carried out consecutively.

After the protrusions have been machined in the brake lining carrier plate, the compressing part 52 with the actuating rod 77 is raised again and brought to its starting position. During the upward movement of the actuating rod 77, the sliding element 56 is pushed back towards the second axis 55 by the at least one return spring 57.

As a result of the crimping procedure, protrusions with corresponding depressions arranged in rows are made in the brake lining carrier plate, whereby the rows are splayed apart radially, that is, configured in a fan formation in their lengthwise extension.

Once the brake lining carrier plate—rotated by 180° around the first axis 54—is clamped on the work bench of the device after the first crimping procedure, a second crimping procedure can then create further rows of protrusions and corresponding depressions in the brake lining carrier plate in such a manner that, after the second crimping procedure, a protrusion is created at the beginning and end of each row.

Figure 4:
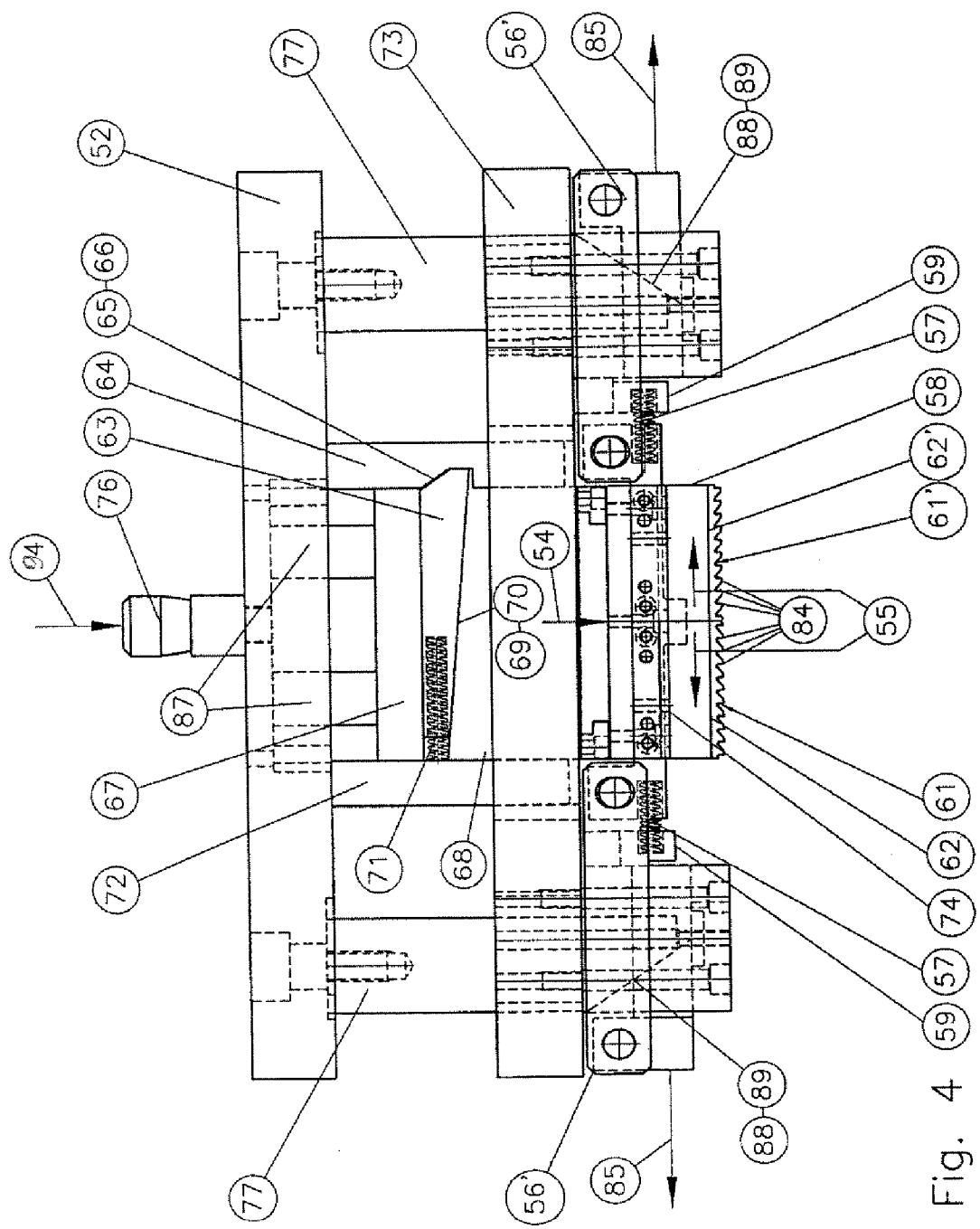
FIG. 4 is a side view of a sectional representation of another embodiment of a device according to the invention with two tool units.
Figure 5:
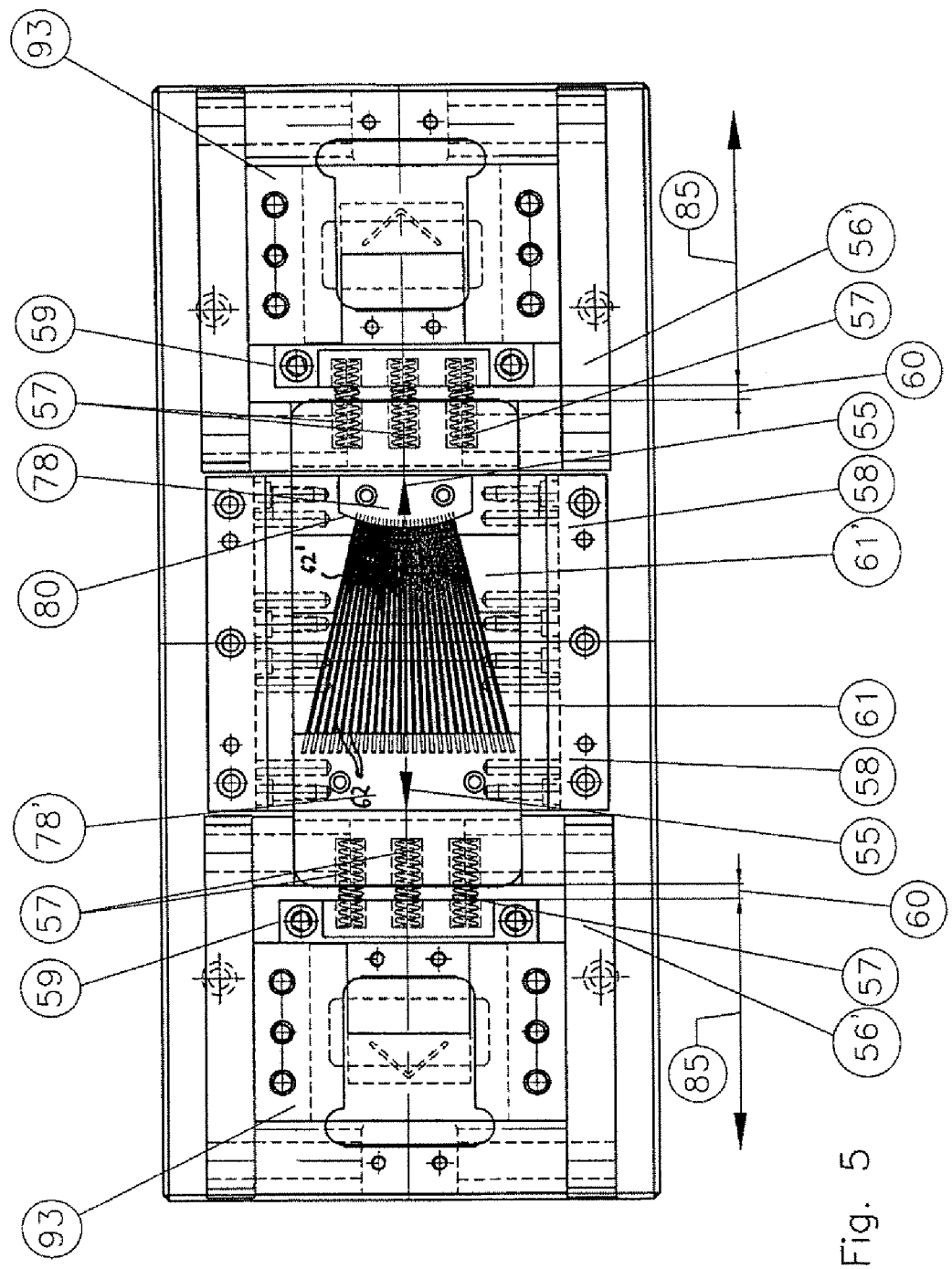
FIG. 5 is a bottom plan view of the device according to FIG. 4.

FIGS. 4 and 5 schematically show another embodiment of the device according to the invention. Components that are identical to those in FIGS. 1 and 2 are designated with the same reference numerals; in this context, reference is hereby made to the description pertaining to FIGS. 1 and 2. The embodiment of the device according to FIGS. 4 and 5 differs from the embodiment according to FIGS. 1 and 2, among other things, in that two tool units 61, 61' are provided to simultaneously machine one or two brake lining carrier plates. Said units 61, 61' are movable in opposite directions in order to produce the protrusions, teeth, burrs, crimps and the like. The tool elements 62, 62' of the two tool units 61, 61' are each configured in a fan formation in their lengthwise extension, whereby the tool elements 62, 62' of the two tool units 61, 61' diverge in the same direction and have essentially the same center of convergence (FIG. 5). With the fan formation, it is also possible for the tool elements 62, 62' of the two tool units 61, 61' to diverge in opposite directions or for the tool elements 62, 62' to run towards each other in a fan formation.

Unlike the embodiment according to FIGS. 1 and 2, in the embodiment according to FIGS. 4 and 5, the sliding element for the appertaining tool unit 61, 61' is configured as a pull slide 56' having a slanted surface 88 facing the tool unit 61, 61'. Here, the tool units 61, 61' are arranged between the sliding elements 56'. With each sliding element 56' configured as a pull slide, the return force acts on the side of the tool unit 61, 61' that is facing the sliding elements 56'.

In the embodiment having two tool units 61, 61' according to FIGS. 4 and 5, each sliding element 56' can be moved towards the second axis 55 (two axis directions shown in FIG. 4) via a separate actuating rod 77 by means of the slanted surfaces 88, 89 that glide along each other when the compressing part 52 is lowered. In this manner, one work cycle suffices to provide a brake lining carrier plate with protrusions arranged in rows, whereby the rows have two sections with protrusions and depressions arranged opposite each other and with a protrusion at the beginning and end of each row.

Figure 6:
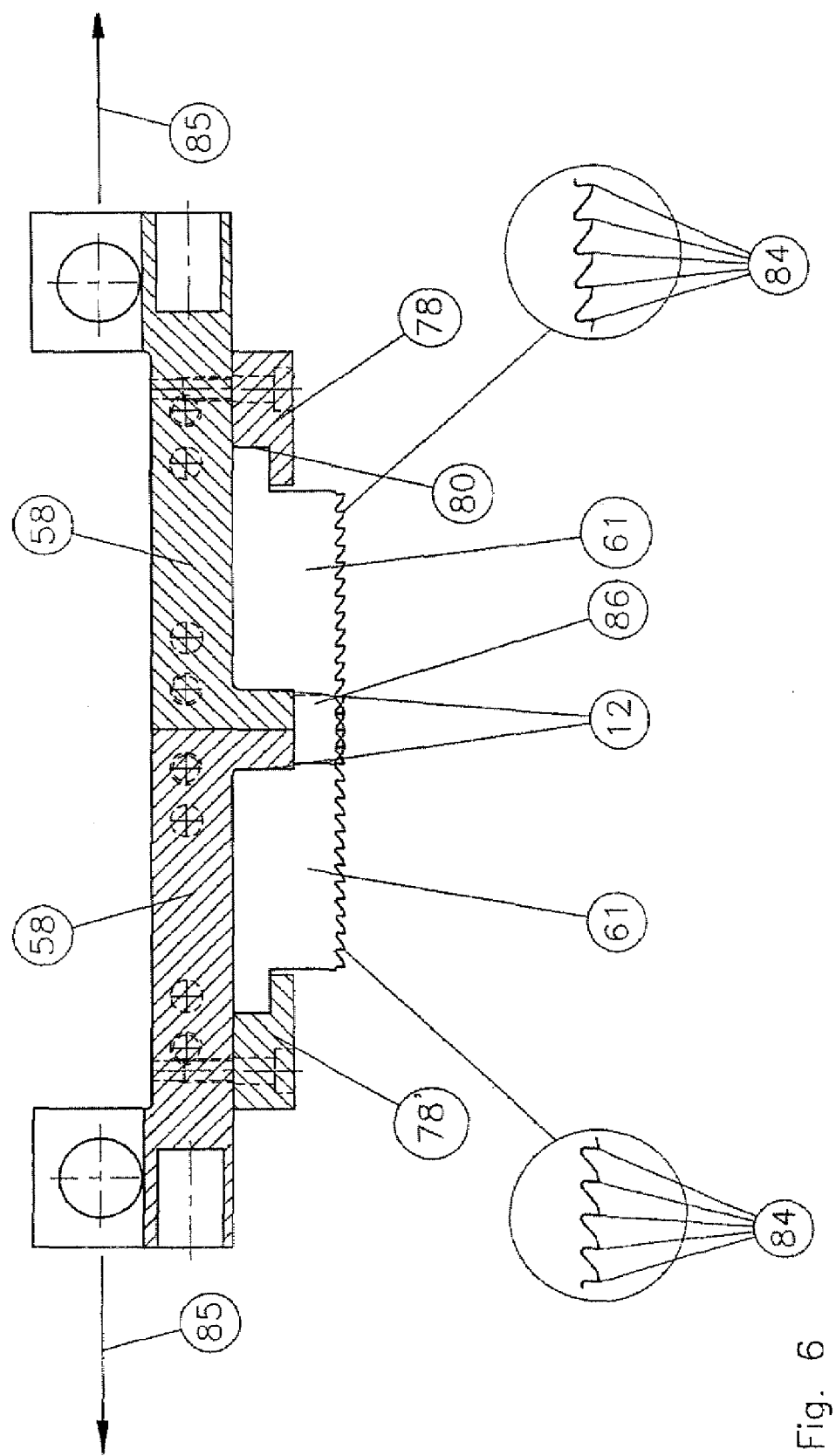
FIG. 6 is a partical cross-sectional view of the tool holding fixtures of the device according to FIG. 4 with tool elements secured therein.

A possible alternate embodiment of the tool holding fixture 58 of the device according to FIGS. 4 and 5 is shown in FIG. 6. Components that are identical to those of the tool holding fixture according to FIG. 3 are designated with the same reference numerals; in this context, reference is hereby made to the description pertaining to FIG. 3. FIG. 6 shows the arrangement of the two tool units 61, 61' in their starting position in which the two tool units 61, 61' exhibit an overlapping area 86. This is where the ends of adjacent tool elements 62 of the one tool unit 61 lie between the ends of adjacent tool elements 62' of the other tool unit 61'. Preferably, the ends overlap or intersect each other above two or more teeth 84. Both tool units 61, 61' can be secured by means of a contact element 78, 78' of the appertaining tool holding fixture 58 against moving towards the first axis 54, whereby one of the contact elements 78, 78' has the circular contact edge 80 for purposes of aligning the teeth 84 of the tool elements 62, 62' so as to be distributed along circular arcs.

Figure 7:
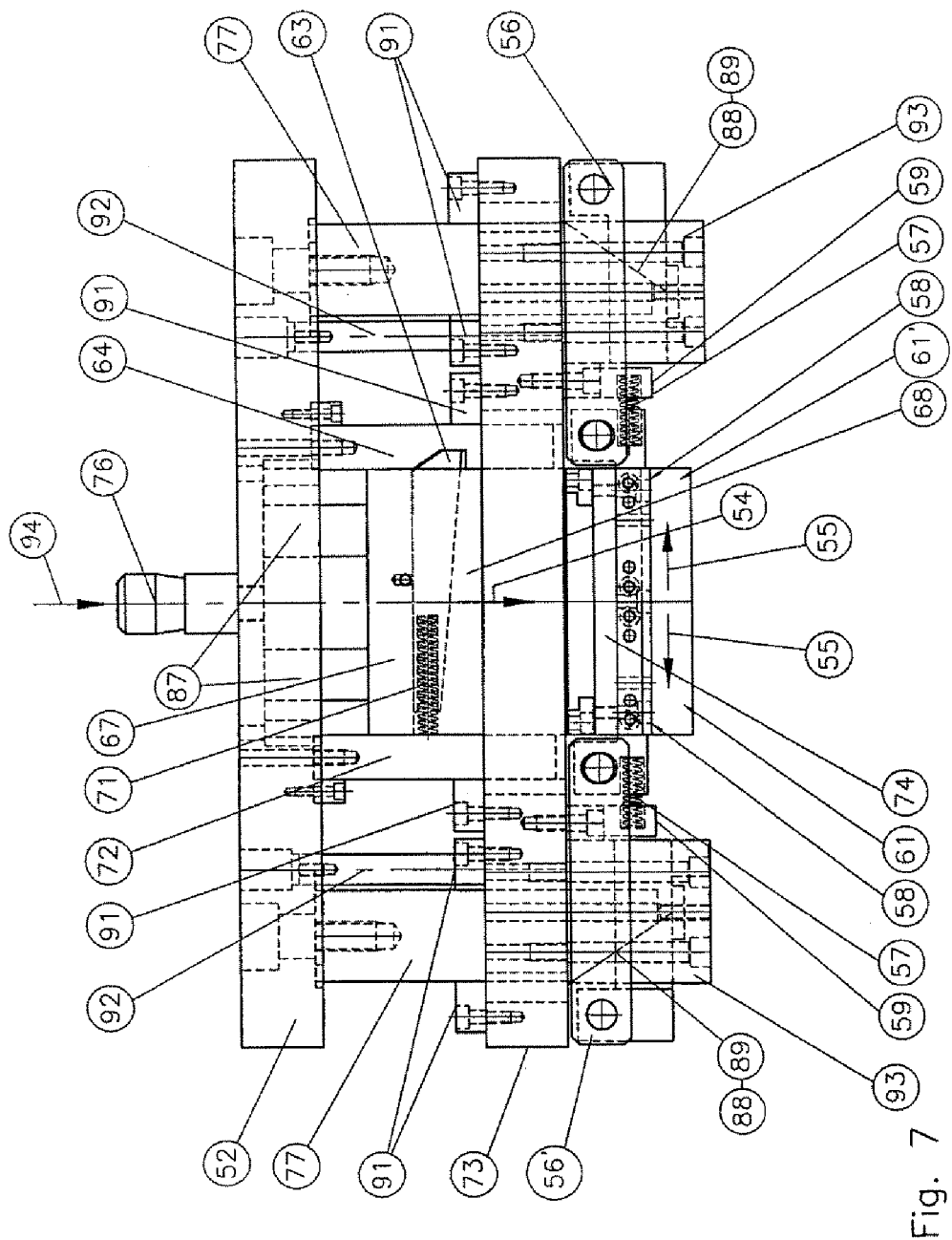
FIG. 7 is a side view of a sectional representation of a refinement of the device according to FIG. 4 with two tool units.
Figure 8:
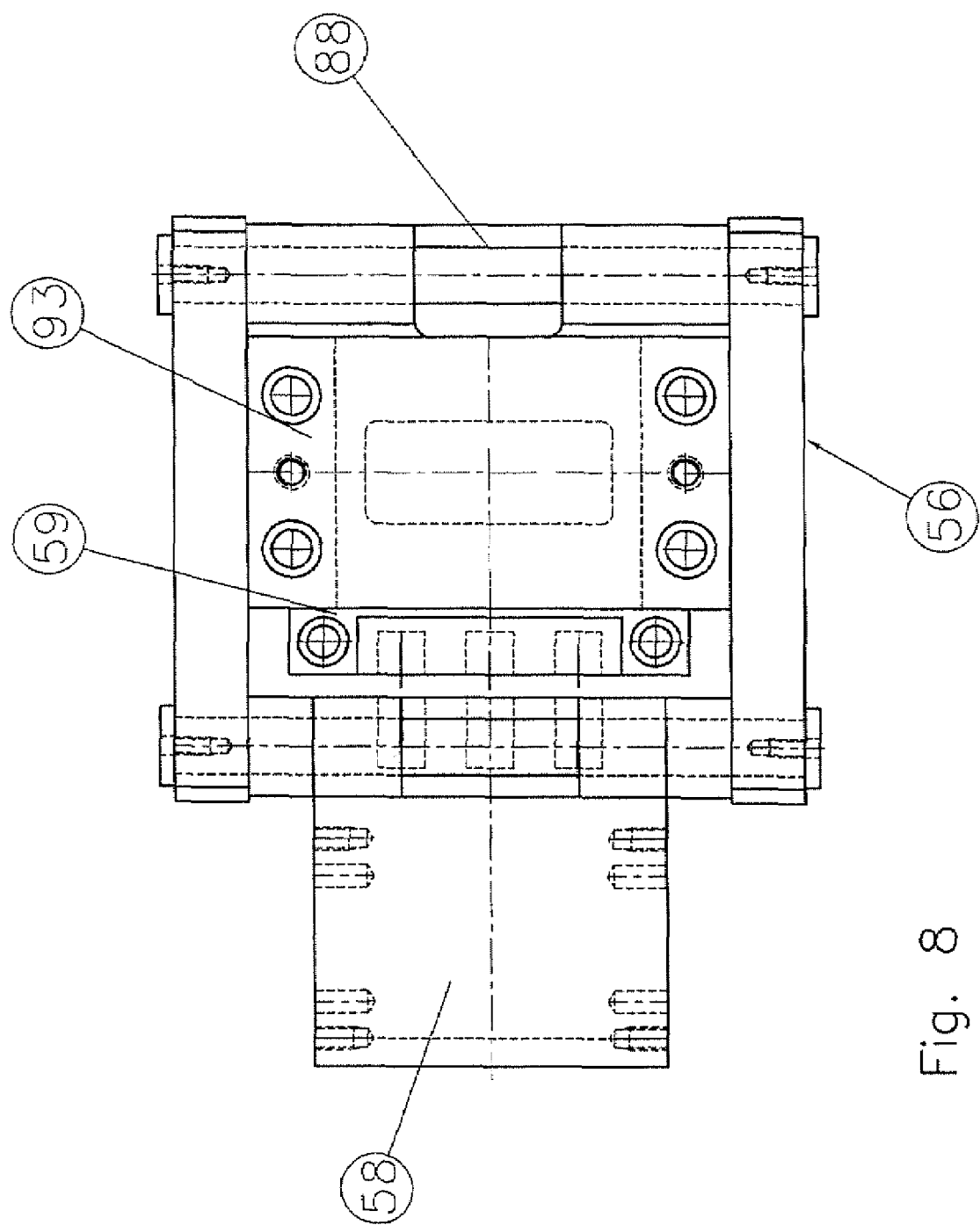
FIG. 8 is a bottom plan view of the components for moving one of the tool units of the device according to FIG. 6.

FIGS. 7 and 8 show a refinement of the embodiment according to FIGS. 5 and 6. Among other differences, guide elements 91 that guide the at least one actuating rod 77 and the guiding slides 64, 72 are arranged on the pressure part 73 in this embodiment. Moreover, while the compressing part 52 is being lowered or raised, it is guided preferably by means of at least one column element 92 arranged in the direction of the first axis 54, said column element being positioned in a bore that is present in the pressure part 73. As can be seen in FIG. 8, there is also a guide 93 for the sliding element 56.

Figure 9:
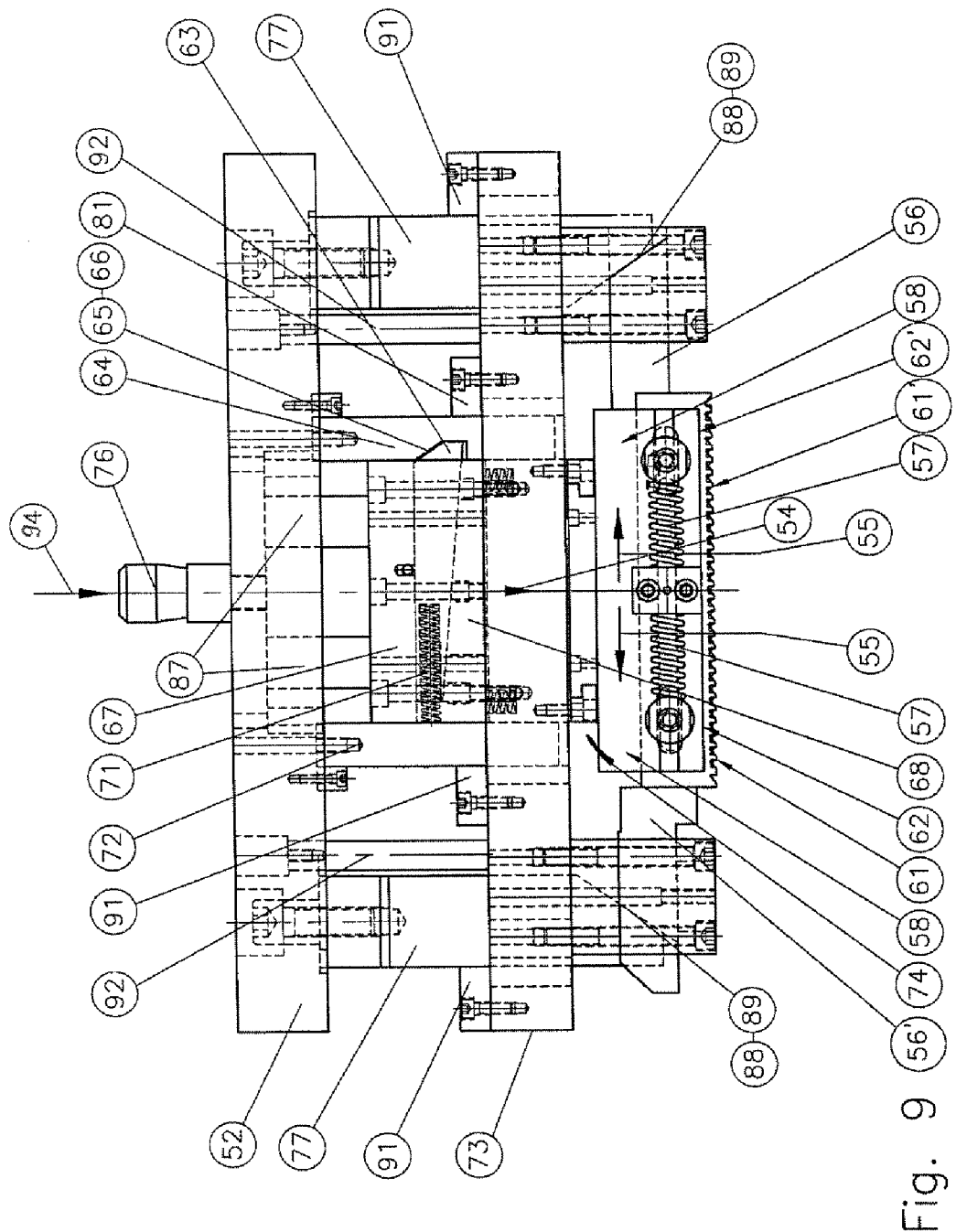
FIG. 9 is a side view of a sectional representation of still another embodiment of the device according to the invention, having two tool units.

Another embodiment of the device according to the invention having two tool units 61, 61' is shown in FIG. 9. Components that are identical to those of the embodiments according to the preceding figures are designated with the same reference numerals. The embodiment according to FIG. 9 differs from the embodiment according to FIGS. 7 and 8, among other things, in that the sliding elements are configured as push slides having the slanted surface 88 facing away from the tool unit 61 or 61' with which they are associated. In this case, when the compressing part 52 is lowered, the tool units 61, 61' move in the opposite direction towards each other.

Other embodiments of the invention will be apparent to those skilled in the art from a reading of the specification and practice of the invention disclosed herein. Therefore, the specification and embodiments described therein are to be considered as exemplary, and the scope and spirit of the invention shall be indicated by the following claims.

What is claimed as new and desired to be protected by Letters Patent of the United States is:

1. A device for machining protrusions, teeth, burrs, and/or crimps in a brake lining carrier plate, comprising:
    a tool unit with tool elements with cutting teeth, wherein said tool elements are arranged in a fixed position relative to each other and in a fan formation in their lengthwise extension;
    a compressing part for driving the cutting teeth into a surface of the brake lining carrier plate in a direction of a first axis generally normal to the brake lining carrier plate surface; and
    forced-guidance means for moving the tool unit towards a second axis generally defined by the surface of the brake lining carrier plate and substantially perpendicular to the first axis.

2. The device according to claim 1, wherein the tool elements are secured in a tool holding fixture, and at least one spacer is installed between adjacent tool elements in order to achieve the fan formation.

3. The device according to claim 2, wherein the spacer is either positively or nonpositively engaged onto one of the two adjacent tool elements.

4. The device according to claim 2, wherein the tool elements are adapted to be clamped between contact elements of a tool holding fixture.

5. The device according to claim 4, wherein the tool elements are secured by means of one of the contact elements of the tool holding fixture against moving towards the first axis.

6. The device according to claim 1, wherein the tool elements are substantially identical.

7. The device according to claim 1, wherein the cutting teeth have tooth tips that face the direction of movement.

8. The device according to claim 1, wherein the forced-guidance means are formed by at least one sliding element that can be actuated by an adjusting device and that can move the tool unit towards the second axis during or after the lowering of the tool unit.

9. The device according to claim 1, wherein the forced-guidance means comprises at least one sliding element and at least one actuating rod arranged in the direction of the first axis, both of which have slanted surfaces that glide along each other in order to move the sliding element towards the second axis.

10. The device according to claim 8, wherein the sliding element is configured as a push slide having a slanted surface facing away from the tool unit.

11. The device according to claim 8, wherein the sliding element is configured as a pull slide having a slanted surface facing the tool unit.

12. The device according to claim 1, wherein the tool unit can be moved against a return force of at least one return spring that rests against a part affixed to a housing of the tool unit.

13. The device according to claim 12, wherein the sliding element is configured as a pull slide having a slanted surface facing away from the tool unit, and the return force acts on the side of the tool unit that faces the sliding element.

14. The device according to claim 12, wherein the sliding element is configured as a push slide having a slanted surface away from the tool unit, and the return force acts on the opposite side of the tool unit that faces away from the sliding element.

15. The device according to claim 1, wherein the movement path for the tool unit towards the second axis is about 3 mm to 7 mm.

16. The device according to claim 1, further comprising a second tool unit having tool elements with cutting teeth to simultaneously machine protrusions, teeth, burrs, or crimps in one or multiple brake lining carrier plate surfaces.

17. The device according to claim 16, wherein the tool unit and the second tool unit are arranged between the sliding elements.

18. The device according to claim 16, wherein the tool unit and the second tool unit overlap in the starting position, whereby ends of adjacent tool elements of one tool unit come to lie between ends of adjacent tool elements of the other tool unit.

19. The device according to claim 1, further comprising a wedge slide and a guiding slide having corresponding slanted surfaces.

20. The device according to claim 19, further comprising a spacer between the compressing part and the wedge slide having at least one pressure spring.

21. The device according to claim 19, wherein the guiding slide extends into a pressure part.

22. The device according to claim 20, wherein the wedge slide rests on the pressure part via a wedge piece, whereby wedge bevels of the wedge slide and of the wedge piece match each other.

23. The device according to claim 20, wherein the wedge slide is pre-tensioned by means of a pressure spring that rests on another guiding slide.

24. The device according to claim 21, wherein the wedge slide comprises a receptacle for the tool holding fixture on a section that passes through the pressure part.

25. The device according to claim 19, further comprising guiding elements being arranged on the pressure part and being adapted to guide the guiding slides.

26. A device for machining protrusions, teeth, burrs, and/or crimps in a brake lining carrier plate, comprising:
    a tool unit with tool elements with cutting teeth, wherein said tool elements are arranged in a fan formation;
    a compression part for driving the tool unit into a surface of the brake lining carrier plate in the direction of a first axis substantially normal to the surface of the brake lining carrier plate;
    forced-control means for moving the tool unit towards the first axis; and
    forced-guidance means for moving the tool unit towards a second axis that is substantially perpendicular to the first axis.

27. The device according to claim 26, wherein the tool elements are fixed in a position relative to each other.

28. The device according to claim 26, wherein the tool elements are secured in a tool holding fixture, and at least one spacer is installed between adjacent tool elements in order to achieve the fan formation.

29. The device according to claim 26, further comprising a second tool unit having tool elements with cutting teeth to simultaneously machine protrusions, teeth, burrs, or crimps in one or multiple brake lining carrier plate surfaces.

30. The device according to claim 29, wherein the tool elements of the second tool unit are arranged in a fan formation in their lengthwise extension that diverge in an opposite direction to the fan formation of the first tool elements.

31. The device according to claim 29, wherein the tool elements of the second tool unit are arranged in a fan formation in their lengthwise extension that extend in the same direction as the fan formation of the first tool elements.

32. A device for machining protrusions, teeth, burrs, and/or crimps in a brake lining carrier plate, comprising:
- a tool unit with tool elements with cutting teeth, wherein said tool elements are arranged in a fixed position relative to each other, and wherein the cutting teeth are distributed in circular arcs or on elliptical orbits;
- a compressing part for driving the cutting teeth into a surface of the brake lining carrier plate in a direction of a first axis generally normal to the brake lining carrier plate surface; and
- forced-guidance means for moving the tool unit towards a second axis generally defined by the surface of the brake lining carrier plate and substantially perpendicular to the first axis.

33. The device according to claim 32, wherein the tool elements are substantially identical.

34. A device for machining protrusions, teeth, buffs, and/or crimps in a brake lining carrier plate, comprising:
- a tool unit with tool elements with cutting teeth, wherein said tool elements are arranged in a fixed position relative to each other, and wherein the cutting teeth are distributed by a circularly or elliptically shaped contact edge of one of the contact elements;
- a compressing part for driving the cutting teeth into a surface of the brake lining carrier plate in a direction of a first axis generally normal to the brake lining carrier plate surface; and
- forced-guidance means for moving the tool unit towards a second axis generally defined by the surface of the brake lining carrier plate and substantially perpendicular to the first axis.

35. A device for machining protrusions, teeth, burrs, and/or crimps in a brake lining carrier plate, comprising:
- a tool unit with tool elements with cuffing teeth, wherein said tool elements are arranged in a fixed position relative to each other;
- a compressing part for driving the cutting teeth into a surface of the brake lining carrier plate in a direction of a first axis generally normal to the brake lining carrier plate surface;
- forced-guidance means for moving the tool unit towards a second axis generally defined by the surface of the brake lining carrier plate and substantially perpendicular to the first axis; and
- a second tool unit having tool elements with cutting teeth to simultaneously machine protrusions, teeth, burrs, or crimps in one or multiple brake lining carrier plate surfaces;
- wherein the tool elements of the tool unit and the tool elements of the second tool unit form fan formations that diverge in the same or opposite directions.

36. The device according to claim 35, wherein tool elements of the tool unit and second tool unit have substantially the same center of convergence.

37. The device according to claim 35, wherein the tool elements of the tool unit and the second tool unit run towards each other in a fan formation.

* * * * *

UNITED STATES PATENT AND TRADEMARK OFFICE
CERTIFICATE OF CORRECTION

PATENT NO. : 7,469,567 B2  Page 1 of 1
APPLICATION NO. : 11/161235
DATED : December 30, 2008
INVENTOR(S) : Friedrich H. Jung It is certified that error appears in the above-identified patent and that said Letters Patent is hereby corrected as shown below:

On the Title Page Item (75) Inventor: "Friedrich Jung" should read -- Friedrich H. Jung --.

On the Title Page Item (73) Assignee: "METEK Metallverarbeitungs Gesellschaft GmbH" should read -- AML Lanxide Europe GmbH --.

Signed and Sealed this

Thirty-first Day of March, 2009

JOHN DOLL
*Acting Director of the United States Patent and Trademark Office*